United States Patent Office 2,721,035
Patented Oct. 18, 1955

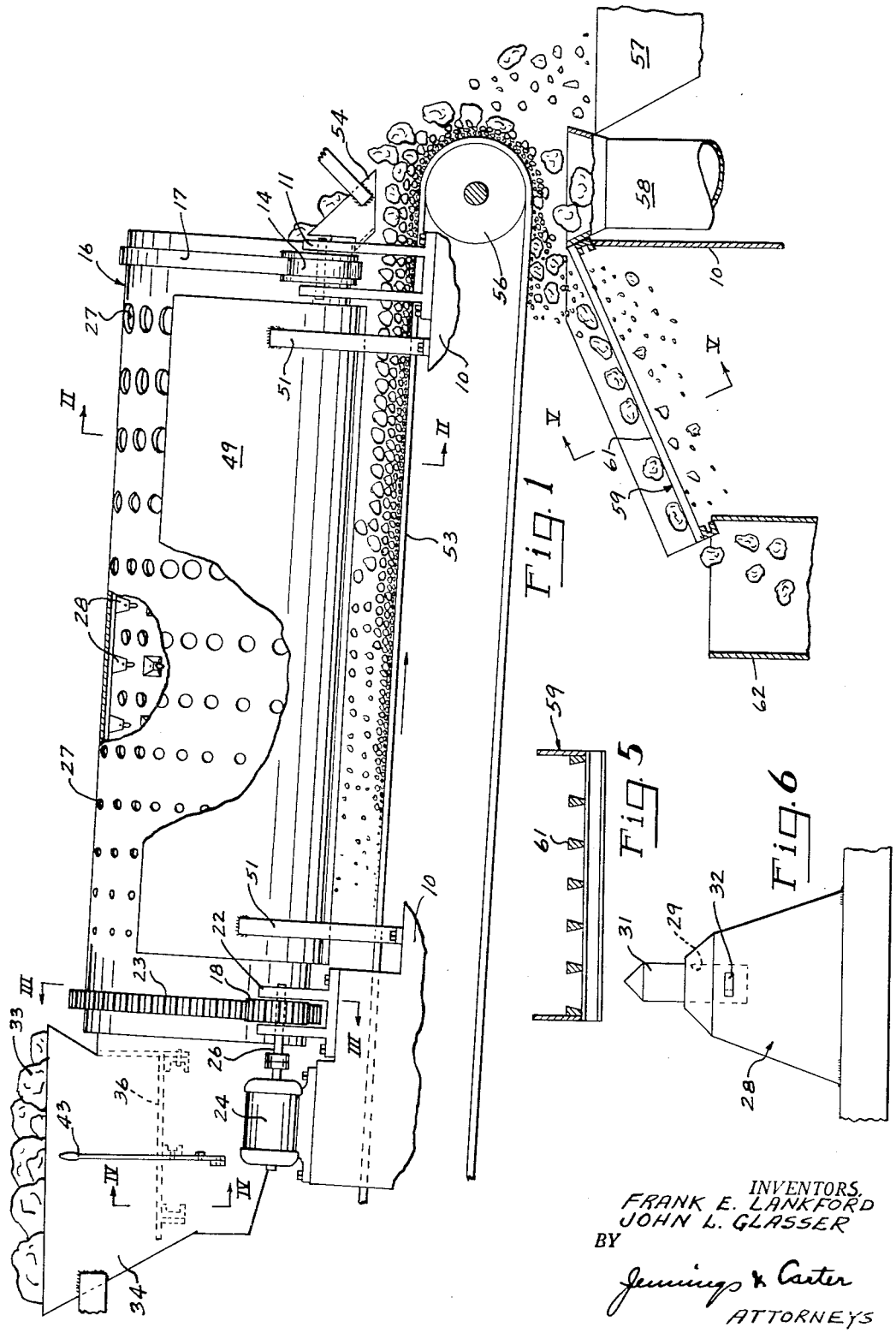

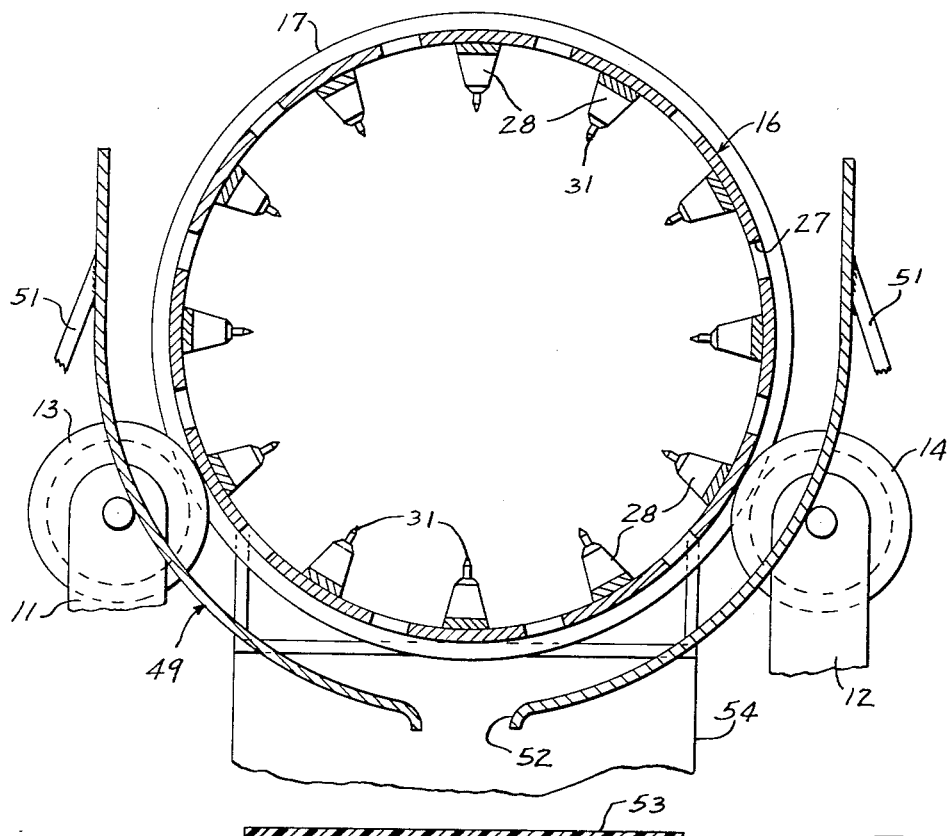
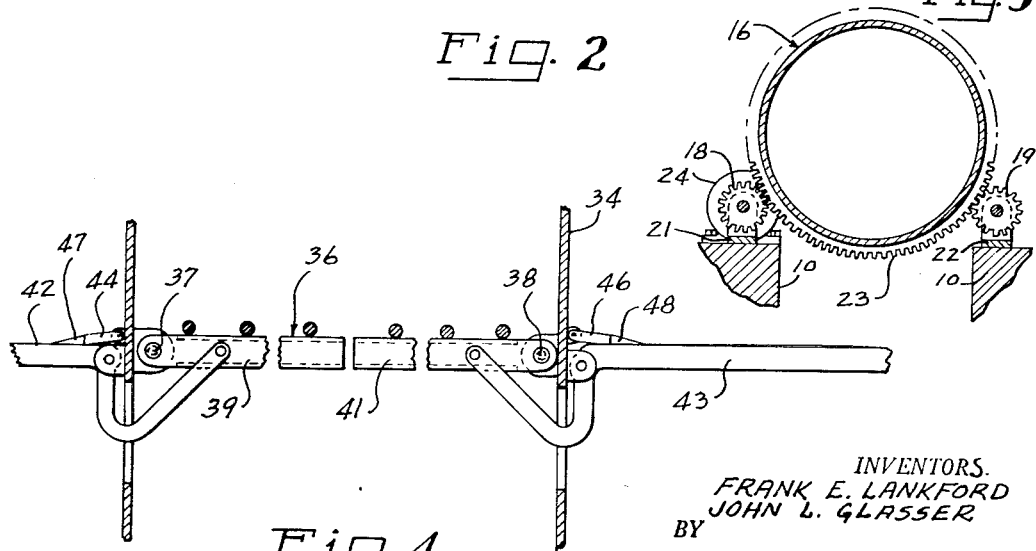

2,721,035

APPARATUS FOR SEPARATING STEEL FROM SLAG

Frank E. Lankford and John L. Glasser, Birmingham, Ala.

Application September 15, 1952, Serial No. 309,629

2 Claims. (Cl. 241—79)

This invention relates to an apparatus for separating steel from slag and has for an object the provision of such apparatus which shall be adapted for separating magnetic materials from non-magnetic materials and then classifying the magnetic materials according to sizes and weights in a single operation.

A more specific object of our invention is to provide an apparatus of the character designated which shall be particularly adapted for separating chunks of steel from slag recovered in an open hearth furnace.

As is well known in the art to which our invention relates, in the production of steel in an open hearth furnace there is a considerable amount of steel which forms in the slag employed in the conversion process and which is skimmed off with the slag. When the slag cools the steel and slag solidify together, the steel being in the slag in chunks or masses of varying sizes which can only be recovered for reuse by breaking the slag away from the chunks of steel and separating the two. Various methods and apparatus have heretofore been proposed for accomplishing this purpose but none, so far as we are aware, have been capable of breaking away the slag and separating and classifying the steel in one operation.

In accordance with our invention, we provide a rotary, spiked, perforated breaker cylinder into which the mixed slag and steel is fed. While passing through the cylinder the charge is tumbled and the slag and steel are broken apart. The mixture is then delivered onto a magnetic separator which, in combination with a suitable screen, separates the steel from the slag and further classifies the masses of steel according to size.

Apparatus embodying features of our invention is illustrated in the accompanying drawings forming a part of this application in which:

Fig. 1 is a side elevational view of the apparatus, partly broken away and in section;

Fig. 2 is a sectional enlarged view taken along the line II—II of Fig. 1;

Fig. 3 is a sectional view taken along the line III—III of Fig. 1;

Fig. 4 is a sectional view taken along the line IV—IV of Fig. 1;

Fig. 5 is a sectional view taken along the line V—V of Fig. 1; and,

Fig. 6 is an enlarged view of one of the breakers employed to break the steel away from the slag.

Referring now to the drawings for a better understanding of our invention we show a frame support indicated generally by the numeral 10. Mounted for rotation at one end of the frame 10 in suitable bearing brackets 11 and 12 are a pair of flanged rollers 13 and 14 respectively which rotatably support one end of an elongated breaker cylinder 16. An annular track 17 encircles and is rigidly secured to the cylinder 16 and engages the flanged rollers 13 and 14. The other end of the cylinder 16 is rotatably supported by a pair of pinions 18 and 19 which are rotatably supported in bearings 21 and 22. The pinions 18 and 19 mesh with a ring gear 23 which encircles and is rigidly secured to the cylinder 16, as shown in Figs. 1 and 3. The pinion 18 is driven by means of a motor 24 through a shaft 26, thus causing the cylinder 16 to be rotated.

The cylinder 16 is perforated as shown at 27, from end to end, except at the ends where it extends over the pinions and ring gear 23 and over the ring 17 and rollers 13 and 14. The perforations adjacent the receiving end of the cylinder 16 are preferably around one inch in diameter and the openings progressively increase in size toward the delivery end to a diameter of approximately 5 inches. Secured to the interior of the cylinder 16 and projecting inwardly thereof are a plurality of breaker members 28 each having a socket 29 for receiving a breaker tooth 31, see Fig. 6. Each breaker tooth 31 is detachably secured in its socket by means of a wedge 32.

The materials to be separated, such as chunks of steel and slag 33, are introduced into the cylinder 16 through a feed hopper 34. The sizes of the masses of materials 33 which are fed into the cylinder are regulated by means of dump grates 36 which are pivotally connected to the sides of the hopper 34 as at 37 and 38. The dump grates comprise two sections 39 and 41, each having bars extending thereacross approximately 6 inches apart so as to permit chunks of material 33 of a size 6 inches and under to pass through the grates into the cylinder 16. Operating levers 42 and 43 are provided for opening the grate sections when it is desired to dump the larger chunks into the cylinder 16. The grate sections 39 and 41 are releasably held in the closed position by means of latch members 44 and 46 which are pivotally connected to the sides of the hopper 34. Detents 47 and 48 are provided adjacent the inner end of each handle member for engaging its associated latch member.

The cylinder 16 is partially encircled along its lower side by a shell 49. The shell is spaced from the cylinder 16 and is supported from the frame support 10 by means of a plurality of brace members 51. An elongated opening 52 is provided in the bottom of the shell 49 and extends substantially from end to end of the cylinder 16. Mounted beneath the cylinder 16 is a belt conveyor 53 with its upper reach adapted to travel in the direction indicated by the arrow and in position to receive the materials which fall through the opening 52. Mounted on the frame 10 and positioned above the belt 53 is a discharge chute 54 which communicates with the discharge end of the cylinder 16. The delivery end of the belt conveyor 53 passes over a magnetic pulley 56, as shown in Fig. 1.

Positioned beneath and outwardly of the discharge end of the conveyor 53 is a receptacle 57 for receiving non-magnetic masses of the material. Positioned directly beneath the magnetic pulley 56 and inwardly of the receptacle 57 is a receptacle 58 for receiving the larger magnetic particles of material. Mounted on the frame 10 adjacent the upper inner edge of the receptacle 58 and extending downwardly and inwardly thereof is a grizzly screen 59 having longitudinally extending bars 61. The bars 61 are spaced laterally from each other approximately 8 inches so as to permit the smaller chunks of steel to fall therebetween. The medium size chunks are discharged at the lower end of the grizzly into a receptacle 62.

From the foregoing description the operation of our improved apparatus for separating steel from slag will be readily understood. The slag and steel in the form of large masses 33 is introduced into the feed hopper 34. The smaller masses fall through the grate 36 into the cylinder 16 where the smaller sizes pass through the perforations 27 and fall onto the shell 49, thence through the opening 52 onto the conveyor 53. The larger chunks of the material 33 remain in the feed hopper until the operating handles 42 and 43 are moved to open the dump grate 36. As the cylinder 16 is rotated, these large chunks 33 are tumbled in intimate contact with each other inside the cylinder thus causing the slag to be broken loose from the steel. This action is aided by the breaker teeth 31 which engage the chunks as they tumble within the cylinder 16. The cylinder 16 is slightly tilted, as shown in Fig. 1 to cause the material to move toward the delivery end of the apparatus. As the cylinder rotates, small particles of slag and steel broken from the chunks of material pass through the perforations 27 and through the openings 52 onto the belt conveyor 53.

The larger masses of material continue their travel through the cylinder 16 and are discharged therefrom through the chute 54 onto the discharge end of the belt conveyor 53. The non-magnetic chunks of material do not adhere to the belt conveyor as they pass over the magnetic pulley 56 but fall into the receptacle 57. The larger magnetic pieces pass around the pulley 56 and fall into the receptacle 58. The medium and smaller size pieces of steel are retained on the belt conveyor 53 until they pass out of the magnetic field where they fall onto the grizzly 59. The smaller pieces of steel pass between the bars 61 of the grizzly and are collected in a suitable container while the medium size pieces of steel are discharged into the receptacle 62.

From the foregoing it will be seen that we have provided improved apparatus for separating steel and slag. By providing the dump grates 36 in the feed hopper and the perforations 27 in the cylinder 16, we are enabled to separate the smaller pieces of material from the larger thus permitting the larger pieces to remain in the cylinder 16 until the slag is broken away from the steel, the length of time that the larger pieces remain in the cylinder being determined by the degree of slope of the cylinder. Other means well known in the art may be employed to cause the materials to pass from one end of the cylinder to the other. The breaker teeth 31 are very effective in removing the slag from the chunks of steel thus permitting complete separation thereof by means of the magnetic pulley 56.

Also, by locating the receptacles 57 and 58 in position to receive the slag and the heavier pieces of steel respectively, and by providing the grizzly for separating the smaller pieces from the medium size pieces of steel, we are able to classify the steel according to varying weights and sizes in a single operation.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In apparatus for separating steel from slag, a rotary cylinder having a plurality of perforations in the wall thereof, a plurality of inwardly projecting breaker teeth mounted on the inner surface of the cylinder, means introducing the materials to be separated into one end of said cylinder, means discharging the larger particles of said materials at the other end of said cylinder, a belt conveyor beneath said cylinder in position to receive the materials passing through said perforations and the materials discharged from the end of said cylinder, a magnetic pulley over which the discharge end of said belt conveyor passes, a receptacle beneath and outwardly of the discharge end of said conveyor in position to receive slag, a second receptacle beneath said discharge end of the conveyor in position to receive the larger size pieces of steel, a downwardly and inwardly sloping grizzly inwardly of and adjacent said second receptacle in position to receive the medium and smaller size pieces of steel, there being openings between the bars of the grizzly of a size to discharge said smaller size pieces, and a receptacle at the lower end of said grizzly in position to receive the medium size pieces of steel.

2. Apparatus as defined in claim 1 in which the means introducing the materials to be separated into one end of the cylinder comprises a feed hopper, a dump grate mounted in the feed hopper, the bottom of said dump grate comprising a plurality of spaced rods whereby the size of the materials fed into the cylinder may be regulated.

References Cited in the file of this patent

UNITED STATES PATENTS

| | | |
|---|---|---|
| 39,899 | Dickey | Sept. 16, 1863 |
| 143,745 | Bradford | Oct. 21, 1873 |
| 296,795 | Sundquist | Apr. 15, 1884 |
| 553,891 | Bach | Feb. 4, 1896 |
| 706,197 | Owen | Aug. 5, 1902 |
| 843,466 | Krickbaum | Feb. 5, 1907 |
| 1,089,238 | Martin | Mar. 3, 1914 |
| 1,188,203 | Peterson et al. | June 20, 1916 |
| 1,259,983 | Hiller | Mar. 19, 1918 |
| 1,339,300 | Swart et al. | May 4, 1920 |
| 1,617,919 | Madsen | Feb. 15, 1927 |
| 1,902,911 | Shallock | Mar. 28, 1933 |
| 1,958,351 | Shingshang | May 8, 1934 |
| 2,099,133 | Munroe et al. | Nov. 16, 1937 |
| 2,189,711 | Eigenbrot | Feb. 6, 1940 |
| 2,264,204 | Heckett | Nov. 25, 1941 |
| 2,269,046 | Whitehead | Jan. 6, 1942 |
| 2,352,712 | Heckett | July 4, 1944 |
| 2,533,357 | Crawford | Dec. 12, 1950 |

FOREIGN PATENTS

| | | |
|---|---|---|
| 227,019 | Great Britain | Jan. 8, 1925 |
| 600,395 | Germany | July 21, 1934 |